United States Patent [19]

Grajek et al.

[11] 4,391,177

[45] Jul. 5, 1983

[54] PIANO SOUNDBOARD AND METHOD OF MAKING SAME

[75] Inventors: Stanley A. Grajek, DeKalb, Ill.; Robert S. Hill, Holly Springs, Miss.; George S. Klaiber, Tonawanda, N.Y.

[73] Assignee: The Wurlitzer Company, DeKalb, Ill.

[21] Appl. No.: 390,293

[22] Filed: Jun. 21, 1982

Related U.S. Application Data

[62] Division of Ser. No. 234,360, Feb. 13, 1981, Pat. No. 4,361,458.

[51] Int. Cl.³ ............................................... G10C 3/06
[52] U.S. Cl. ......................................... 84/196; 84/192
[58] Field of Search .................................. 84/192–196

[56] References Cited

U.S. PATENT DOCUMENTS

| | | | |
|---|---|---|---|
| 1,694,789 | 12/1928 | Muckey | 84/194 |
| 2,070,391 | 2/1937 | Bilhuber | 84/192 |
| 2,469,522 | 5/1949 | Sauerland | 84/192 |
| 3,643,539 | 2/1972 | Andersen | 84/195 |

FOREIGN PATENT DOCUMENTS 366585  5/1923  Fed. Rep. of Germany ........ 84/192

*Primary Examiner*—Lawrence R. Franklin
*Attorney, Agent, or Firm*—Trexler, Bushnell & Wolters, Ltd.

[57] ABSTRACT

A soundboard for a piano comprises three plies of wood bonded together, the front and back plies being of substantially equal thickness and the center ply being of a thickness greater than the sum of the thicknesses of the front and back plies. The center ply comprises a plurality of elongate boards each having a preselected curvature from side-to-side, these boards are bonded together edge-to-edge with the curvature of each board in the same direction to form a composite board having a substantially continuous curvature, concave on one side and convex on the other side. Consequently, the assembled, three-ply soundboard has a curvature imparted thereto by the center ply.

8 Claims, 5 Drawing Figures

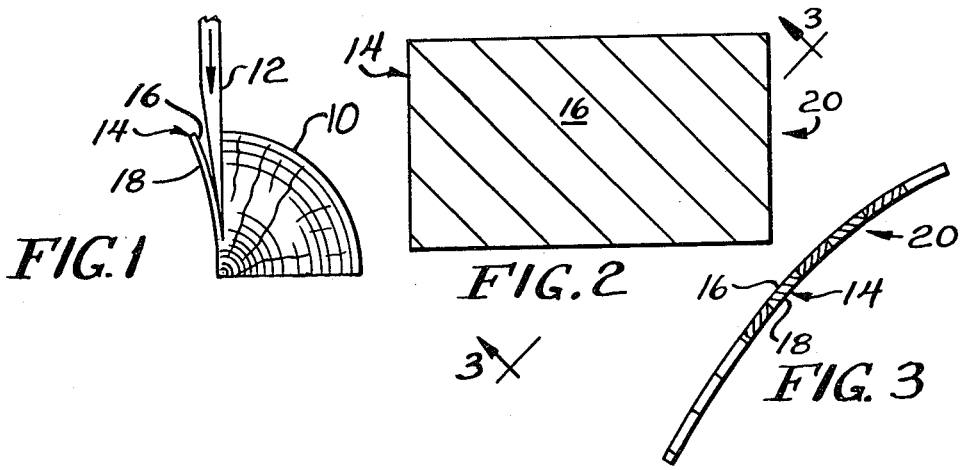
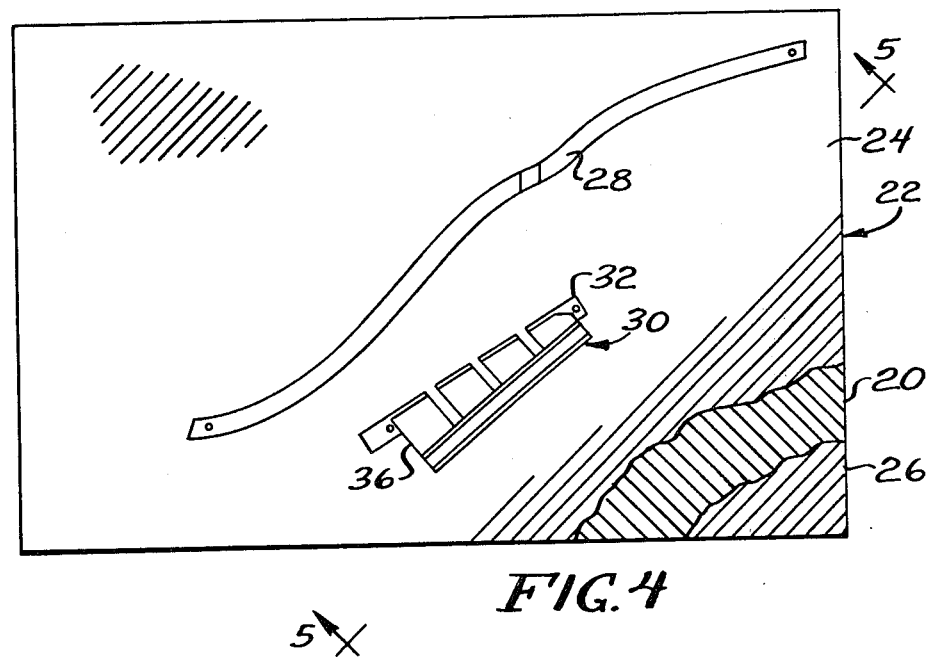
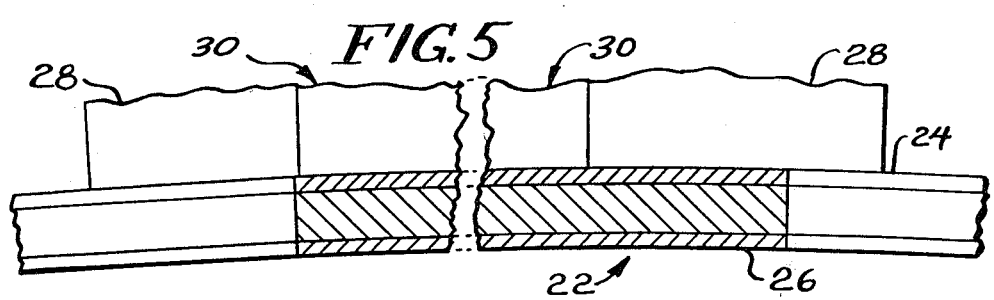

PIANO SOUNDBOARD AND METHOD OF MAKING SAME

This application is a division of application Ser. No. 234,360, filed 2/13/81, now U.S. Pat. No. 4,361,458.

BACKGROUND OF THE INVENTION

This invention relates generally to piano construction and more particularly to a novel and improved soundboard for a piano.

Pianos have traditionally been built with soundboards constructed entirely of wood. It is known that relatively closely grained spruce wood produces superior soundboards. Additionally, it has been the practice to quarter-saw spruce boards for piano soundboards. Consequently, a board sawn in this fashion can be no wider than the radius of the log from which it is sawn. Moreover, since the center and sap wood are to be avoided, the width of such boards is further limited. Thus, it has been conventional practice to use a number of spruce boards of an appropriate thickness and edge-joined, as by gluing, to make up the necessary width of a soundboard.

Additionally, it has been found that for best sound propagation in a soundboard the elasticity should be high and density low. Thus, many spruce or pine woods are not satisfactory since their growth is generally too fast, leaving too open a grain, which results in inappropriate density and elasticity. Consequently, only selected spruce woods are suitable for construction of a piano soundboard and these are generally grown under somewhat adverse climatic conditions, whereby the growth is slow and the grain rather closely spaced. In this regard, it has been found that the preferred grain spacing is on the order of ten annular rings per inch, from which it can be seen that only relatively old trees are suitable for obtaining such boards.

As a result of all of the foregoing strictures, the supply of suitable spruce wood for piano soundboards is quite limited, and the production of such boards has become increasingly expensive.

In order to remedy this situation, some effort has been made in the past to construct laminated soundboards, formed from a number of relatively thin plies of wood.

In this latter regard, our copending application, Ser. No. 969,722, filed Dec. 15, 1978, now U.S. Pat. No. 4,248,124 reveals one such laminated soundboard. As disclosed in our aforesaid application, we have discovered that it is advantageous to construct a three-ply soundboard wherein the top and bottom plies are of substantially equal thickness and wherein the center ply is of greater thickness than the sum of the thicknesses of these outer plies. Additionally, the grains of the outer plies are aligned in parallel with one another while the grain of the center or core ply is aligned at right angles to the grains of the two outer plies.

While the foregoing presents a superior soundboard structure, there is room for yet further improvement. Specifically, some desirable features have also been found to be provided by crowned or arched soundboards, whereby the prior art has endeavored in some cases to construct such soundboards. In this regard, it has been the practice to provide a press or molding device in the construction of a soundboard so as to impart the desired arch, crown or curvature thereto. However, many of these prior art methods of construction of such curved or arched soundboards have proven difficult and expensive and often fail to provide a sonically satisfactory soundboard which is reliable in service.

We have now discovered a soundboard construction which provides a natural arch or curvature in a three-ply laminated soundboard of the type shown in our copending application, mentioned above.

OBJECTS AND SUMMARY OF THE INVENTION

Accordingly, it is an object of the present invention to provide a novel and improved piano soundboard.

A more specific object is to provide a novel and improved three-ply laminated soundboard having a natural crown, and a method of making such a soundboard.

A related object is to provide a naturally arched or crowned three plies of wood bonded together, the front and back plies being of substantially equal thickness and the center ply being of a thickness greater than the sum of the thicknesses of the front and back plies. The center ply comprises a plurality of elongate boards each having a preselected curvature from side-to-side and bonded together edge-to-edge with the curvature of each board facing in the same direction to form a composite board having a substantially continuous curvature, concave on one side and convex on the other side, whereby the assembled, three-ply soundboard has a curvature imparted thereto by the center ply.

In accordance with another aspect of the invention, a core piece for a multiple ply soundboard comprises a plurality of elongate boards each having a preselected curvature from side-to-side and bonded together edge-to-edge with the curvature of each board facing the same direction to form a composite core piece having a substantially continuous curvature, concave on one side and convex on the other side.

In accordance with a further aspect of the invention, a method of building a soundboard for a piano comprises the steps of selecting a plurality of elongate boards, each having a predetermined curvature from side-to-side, bonding the elongate boards together edge-to-edge with the curvature of each board facing in the same direction to form a composite board having a substantially continuous curvature, concave on one side and convex on the other side, bonding a further ply of wood to each of said concave and convex sides of said composite core board, each of said additional plies of wood being of substantially equal thickness, but less than one-half the thickness of the composite core board, whereby the assembled, three-ply soundboard has a curvature imparted thereto by said composite core board.

BRIEF DESCRIPTION OF THE DRAWINGS

The invention will be better understood upon consideration of the following detailed description of the illustrated embodiment together with the accompanying drawings, wherein:

FIG. 1 illustrates the quarter-cutting of individual boards from a log in accordance with one aspect of the invention;

FIG. 2 illustrates a composite core board constructed of a number of boards cut from a log as illustrated in FIG. 1;

FIG. 3 is a view, partially in section, and taken generally along the line 3—3 of FIG. 2;

FIG. 4 is a top plan view, partially cut away, of a piano soundboard constructed in accordance with the present invention; and FIG. 5 is a view, partially in section, and taken generally along the line 5—5 of FIG. 4.

DETAILED DESCRIPTION OF THE ILLUSTRATED EMBODIMENT

Referring now to the drawings, and initially to FIG. 1, the boards for a piano soundboard are conventionally quarter-cut from a log 10. In this regard, a board 14 is shown being cut in a substantially radial direction with respect to the log 10.

Departing from convention, and in accordance with the present invention, a knife or similar tool 12 is utilized to slice each board 14 from the log 10. Advantageously, this slicing action tends to stretch the inner side 16 of the board 14 somewhat while at the same time causing the opposite or outer side 18 to curl over and away from the log 10 somewhat. Thus, the board 14 is formed with a natural curvature, the side 16 being convex and the side 18 being concave.

It will be noted that this tendency of a board to curve or curl somewhat when sliced from a log 10 is more marked, the thicker the board being sliced, the stress applied during slicing being substantially proportionate to the thickness thereof.

Referring now to FIG. 2, a core piece or ply 20 for a soundboard in accordance with the invention is formed from a plurality of boards such as the board 14, each sliced from a log such as the log 10 in the fashion shown in FIG. 1. Preferably, these boards are laid together diagonally edge-to-edge and the ends are cut to suitable angles and lengths and edge-glued to form a substantially rectangular core board 20.

More importantly, and in accordance with one aspect of the invention, these boards 14 are selected with a desired degree of curvature and laid edge-to-edge with all the convex sides 16 facing in one direction and all of the concave sides 18 facing oppositely. Accordingly, when the boards 14 are glued together, a composite core board 20 is formed which has the natural, composite curvature of the boards 14 which have been selected, cut and joined to form the core board 20.

In accordance with the present invention, front and back plies 24, 26 are similarly constructed from boards sliced or cut from a log in similar fashion. That is, substantially rectangular front and back plies are constructed by angularly cutting the ends of a plurality of boards laid diagonally edge-to-edge to form a rectangle and gluing the edges of the cut boards together. These front and back plies 24, 26 are then glued to the core ply 22 to form a three-ply soundboard.

In constructing this three-ply soundboard, as shown in FIGS. 4 and 5, to which reference is now invited, the boards forming the front and back plies 24, 26 are of a substantially equal, predetermined thickness. Moreover, this thickness is substantially thinner than that of the boards 14 of the core poly or board 20. In this regard, the core board 20 is preferably substantially greater in thickness than the sum of thicknesses of the two outer plies or faces. For example, the core ply 20 may be on the order of three times the thickness of either of the front ply 24 or back ply 26.

In one practical and preferred embodiment, the core 20 is on the order of 0.166 inches thick while the face and back plies 24, 26 are each on the order of 0.050 inches thick. Accordingly, the thicker boards 14 of the core piece 20, as noted above, are stressed to a substantially greater degree when sliced in the fashion shown in FIG. 1, than the thinner boards forming the front and back plies. Consequently, the substantially thinner front and back plies 24, 26 tend to yield so as to conform to the curvature of the thicker center or core ply 20 when glued thereto, such that the resulting soundboard 22 has substantially the same natural crown, arch or curvature as the core board 20.

In accordance with a preferred embodiment of the invention, the front and back plies 24, 26 are aligned with their grain substantially parallel one to another, but substantially at right angles to the grain of the core board 20. As more fully described in our copending application mentioned above, the diagonal laying up of the boards 14 of each of the plies, and the just described relative alignment of the grains of each of the plies is believed to produce a superior soundboard.

Further in accordance with a preferred form of the invention, bridges 28, 30 are affixed to the soundboard 22 on the convex side thereof. It is believed that this construction further enhances the sonic properties of the soundboard 22. In particular, a treble bridge 28 comprises an elongate, multi-curved strip of wood which may be secured to the soundboard 22 by screws at its opposite ends and by gluing. The treble strings (not shown) thus run upwardly across the bridge 28 at substantially a 45° angle thereto. Preferably the treble bridge is aligned to run substantially parallel with the grain of the top or front ply 24. A bass bridge 30 is positioned so as to run substantially in parallel with the treble bridge 28 and is also affixed to the convex side of the soundboard 22. This bass bridge preferably includes a runner 32 secured by screws 34 to the soundboard 22 and also glued to the soundboard, preferably by means of a catalyzed polyvinyl glue. The bass bridge 30 also includes an apron or plate 36 comprising a board glued on top of the runner 32. The remainder of the bass bridge may be substantially in accordance with that described in our aforementioned copending application and need not be described in detail herein.

What has been shown and described herein is a novel and improved soundboard and a method for constructing such a soundboard. While the invention has been illustrated and described herein with reference to a preferred embodiment, the invention is not limited thereto. On the contrary, those skilled in the art may device various alternatives, changes and modifications upon reading the foregoing descriptions. Accordingly, the invention includes such alternatives, changes and modifications insofar as they fall within the spirit and scope of the appended claims.

The invention is claimed as follows:

1. A soundboard for a piano comprising: three plies of wood bonded together, the front and back plies being of substantially equal thickness and the center ply being of a thickness greater than the sum of the thicknesses of the front and back plies, the center ply comprising a plurality of elongate boards each having a preselected curvature from side-to-side and bonded together edge-to-edge with the curvature of each board in the same direction to form a composite board having a substantially continuous curvature, concave on one side and convex on the other side, whereby the assembled, three-ply soundboard has a curvature imparted thereto by the center ply.

2. A soundboard according to claim 1 and further including a bridge attached to the convex side thereof.

3. A soundboard according to claim 1 or claim 2 wherein the grain of said elongate boards forming the center ply run substantially lengthwise thereon and wherein the grains on the front and back plies are substantially parallel to each other and at right angles with the grain of the boards forming the center ply.

4. A soundboard according to claim 2 wherein the bridge runs in a direction substantially parallel with the grain of the front ply.

5. A soundboard according to claim 1 or claim 2 wherein said elongate boards forming said center ply are laid up diagonally to form a substantially rectangular composite board, the boards being on substantially a 45° angle with respect to the sides of the composite, rectangular board.

6. A soundboard according to claim 1 or claim 2 wherein said center ply is substantially on the order of three times the thickness of either of said front ply or said back ply.

7. A core piece for a multiple ply soundboard comprising a plurality of elongate boards each having a preselected curvature from side-to-side and bonded together edge-to-edge with the curvature of each board in the same direction to form a composite core piece having a substantially continuous curvature, concave on one side and convex on the other side.

8. A core piece for a soundboard according to claim 7 wherein said elongate boards are laid up on a diagonal to form a substantially rectangular composite core board, said elongate boards being on an angle of substantially on the order of 45° with respect to the rectangular composite core board.

* * * * *